United States Patent
Mason et al.

(10) Patent No.: US 7,476,194 B2
(45) Date of Patent: Jan. 13, 2009

(54) IN-CONTAINER MINERALIZATION

(75) Inventors: John Bradley Mason, Pasco, WA (US); Thomas W. Oliver, Marietta, GA (US)

(73) Assignee: Studsvik, Inc., Atlanta, GA (US)

( * ) Notice: Subject to any disclaimer, the term of this patent is extended or adjusted under 35 U.S.C. 154(b) by 815 days.

(21) Appl. No.: 10/972,068

(22) Filed: Oct. 22, 2004

(65) Prior Publication Data

US 2005/0096495 A1 May 5, 2005
US 2006/0009671 A9 Jan. 12, 2006

Related U.S. Application Data

(63) Continuation-in-part of application No. 10/374,293, filed on Feb. 26, 2003, which is a continuation-in-part of application No. 10/246,266, filed on Sep. 18, 2002, now Pat. No. 7,011,800, which is a continuation-in-part of application No. 10/185,616, filed on Jun. 28, 2002, now abandoned, which is a continuation-in-part of application No. 10/111,148, filed on Apr. 19, 2002, now Pat. No. 7,125,531, which is a continuation-in-part of application No. 10/209,090, filed on Jul. 31, 2002, and a continuation-in-part of application No. PCT/US00/41323, filed on Oct. 19, 2000, which is a continuation of application No. 09/421,612, filed on Oct. 20, 1999, now Pat. No. 6,280,694.

(51) Int. Cl.
*B09B 3/00* (2006.01)

(52) U.S. Cl. .................................. 588/252; 588/254

(58) Field of Classification Search ................. 588/252, 588/254
See application file for complete search history.

(56) References Cited

U.S. PATENT DOCUMENTS

| | | |
|---|---|---|
| 3,907,674 A | 9/1975 | Roberts et al. |
| 4,154,643 A | 5/1979 | Cook et al. |
| 4,218,427 A | 8/1980 | Yan |
| 4,224,289 A | 9/1980 | Covey et al. |
| 4,226,830 A | 10/1980 | Davis |
| 4,448,589 A | 5/1984 | Fan et al. |
| 4,483,692 A | 11/1984 | Patel |
| 4,609,537 A | 9/1986 | Tolpin et al. |
| 4,656,147 A | 4/1987 | Iida et al. |
| 4,662,081 A | 5/1987 | Greenwood |
| 4,664,678 A | 5/1987 | Rehmat et al. |
| 4,665,632 A | 5/1987 | Greenwood |
| 4,668,435 A | 5/1987 | Grantham |
| 4,692,318 A | 9/1987 | Tolpin et al. |
| 4,726,916 A | 2/1988 | Aubert et al. |
| 4,966,101 A | 10/1990 | Maeda et al. |
| 4,982,027 A | 1/1991 | Korff et al. |
| 4,993,323 A | 2/1991 | Tabery et al. |
| 5,084,258 A | 1/1992 | Lin |
| 5,085,838 A | 2/1992 | Mason |
| 5,096,692 A | 3/1992 | Ek |
| 5,224,334 A | 7/1993 | Bell |
| 5,387,738 A | 2/1995 | Beckham et al. |
| 5,476,990 A * | 12/1995 | Hittner et al. ............... 588/314 |
| 5,518,702 A | 5/1996 | Perry |
| 5,536,896 A | 7/1996 | Hesbol et al. |
| 5,707,592 A | 1/1998 | Someus |
| 5,846,278 A * | 12/1998 | Jantzen et al. ............... 65/17.1 |
| 5,909,654 A | 6/1999 | Hesbol et al. |
| 6,084,147 A | 7/2000 | Mason |
| 6,133,498 A | 10/2000 | Singh et al. |
| 6,211,254 B1 | 4/2001 | Whitney |
| 6,280,694 B1 | 8/2001 | Mason |
| 6,281,164 B1 | 8/2001 | Demmel et al. |
| 2003/0198584 A1 | 10/2003 | Mason |
| 2004/0024279 A1 | 2/2004 | Mason |

FOREIGN PATENT DOCUMENTS

| | | |
|---|---|---|
| EP | 0471278 | 2/1992 |
| FR | 2.106.844 A | 5/1972 |
| GB | 2 048 555 A | 12/1980 |
| GB | 2271517 | 4/1994 |
| JP | 01 171685 A | 7/1989 |
| RU | 2216396 | 11/2003 |
| WO | WO 94/08661 | 4/1994 |
| ZA | 200203941 | 1/2003 |

OTHER PUBLICATIONS

Cementitious Solidification of DOE's Legacy Reprocessing Waste by Darryl D. Siemer of Idaho national Engineering and Environmental Laboratory.

(Continued)

*Primary Examiner*—Edward M Johnson
(74) *Attorney, Agent, or Firm*—King & Spalding

(57) ABSTRACT

A method of waste stabilization by mineralization of waste material in situ in a treatment container suitable or treatment, transit, storage and disposal. The waste material may be mixed with mineralizing additives and, optionally, reducing additives, in the treatment container or in a separate mixing vessel. The mixture is then subjected to heat in the treatment container to heat-activate mineralization of the mixture and form a stable, mineralized, monolithic solid. This stabilized mass may then be transported in the same treatment container for storage and disposal.

34 Claims, No Drawings

OTHER PUBLICATIONS

Webpage Alternative High-Level Waste Treatments at the Idaho National Engineering and Environmental Laboratory; http://books.nap.edu/books/030906628X/html/56.html; 2 pages dated Sep. 25, 2004.

Webpage—Alternative High-Level Waste Treatments at the Idaho National Engineering and Environmental Laboratory; ;http:///books.nap.edu/books/030906628X/html/56.html; 2 pages ; dated Sep. 25, 2004.

Scott Jeffers, John F. Mullen, Austin J. Cohen and Ky Dangtran "Control Problem Waste Feeds in Fluid Beds" from May 1999, 5 pages.

Clarence J. Wall, John T. Graves and Elliott J. Roberts "How to Burn Salty Sludges" from Apr. 14, 1975, 6 pages.

Joseph A. Nenni, Richard D. Boardman "Thermal Denitration and Mineralization of Waste Constituents" 14 pages.

* cited by examiner

IN-CONTAINER MINERALIZATION

CROSS-REFERENCE TO RELATED APPLICATIONS

This application is a continuation-in-part of U.S. patent application Ser. No. 10/209,090 filed Jul. 31, 2002, and also a continuation-in-part of U.S. patent application Ser. No. 10/374,293 filed Feb. 26, 2003, which is a continuation-in-part of U.S. Pat. application Ser. No. 10/246,266 filed Sep. 18, 2002 now U.S. Pat. No. 7,011,800, which is a continuation-in-part of U.S. patent application Ser. No. 10/185,616 filed Jun. 28, 2002 now abandoned, which is a continuation-in-part of U.S. patent application Ser. No. 10/111,148 filed Apr. 19, 2002 now U.S. Pat. No. 7,125,531, and also a continuation-in-part of PCT/US00/41323, filed Oct. 19, 2000, which is a continuation of U.S. Pat. No. 6,280,694, issued on application Ser. No. 09/421,612 filed Oct. 20, 1999 now U.S. Pat. No. 6,280,694. The entire contents of each of these prior applications and patents, except Ser. No. 10/374,293, are expressly incorporated herein by reference.

TECHNICAL FIELD OF INVENTION

The present invention relates generally to a process for promoting a chemical change of waste materials into a monolithic solid through the application of heat. In particular, this invention applies to the stabilization of hazardous wastes that require treatment prior to shipment, storage, and/or disposal.

BACKGROUND OF THE INVENTION

Hazardous waste handling, transportation and disposal are heavily regulated activities. In particular, hazardous waste must be processed for disposal prior to shipment to the disposal site. Therefore, there is a need for processing methods to enable waste to meet disposal requirements prior to shipment.

There are currently many types of treatment processes for stabilizing hazardous waste including micro-encapsulation, macro-encapsulation, and heat-activation processes. In addition to the effectiveness of the stabilization processes, handling requirements and costs also have an impact on the type of treatment process selected by the waste generator. As requirements and costs increase, generators demand more effective and cost efficient means of waste treatment.

Hazardous wastes may be in the form of sludge, debris, wastes with high organic content, wastes with high nitrate or nitrogen containing content, wastes with high heavy metal content, radioactive wastes, asbestos, liquid solutions and slurries or solids.

One means by which hazardous waste is presently stabilized is through the use of cement. Cement and waste are mixed at ambient temperatures. Hydration and crystallization reactions occur upon the addition of water. These reactions lead to the formation of a monolithic solid in which the waste is chemically bound or encapsulated in the resulting matrix.

Still another treatment process is encapsulation. In encapsulation, polymeric reagents and waste are mixed. Heat is then applied to the mixture to melt the polymer reagent. As the mixture cools, thermosetting polymer reagents such as siloxane, sol-gel, and polyester form long-chain polymers that encapsulate waste in a monolithic solid. Alternatively, thermoplastic reagents such as polyethylene, paraffin, and bitumen may be used.

Heat activated vitrification, another stabilization process, uses glass to form a matrix for encapsulating the wastes. Glass frit or glass forming chemicals are combined with waste and melted to form a fluid mixture that solidifies upon cooling into an amorphous solid. The solidified, stabilized matrix is suitable for transportation and disposal.

Hydroceramic cement stabilization is yet another stabilization process, commonly used on hazardous nitrate waste. This process combines calcine compounds with reagents such as clay, sodium hydroxide, and vermiculite to form a hydroceramnic mixture. The hydroceramic mixture is then mixed with nitrate-containing wastes to form a waste mixture. The waste mixture is heated to activate it. However, this process is limited in the proportion of nitrates that can be input. For example, the maximum nitrate level that can be efficiently immobilized is about 25% of the amount of the alkali metals present. If the amount of nitrates exceeds this alkali metal ratio, some of the nitrate will not be immobilized and can be readily leached from the solid matrix. Furthermore, heat activation temperatures must be kept below about 150° C. to prevent decomposition of nitrates present in the waste.

Yet another heat activation treatment method involves pre-mixing waste materials with additives. The resulting mixture is dried and sintered to achieve the final monolithic waste form. Sintering involves heating the waste and additives to a high enough temperature to partially melt or fuse the waste and additives into a monolithic solid. This method uses three separate operations in three separate process containers.

There is a need for a process for stabilizing hazardous wastes that is more effective and efficient for stabilizing wastes prior to transport, storage and disposal.

SUMMARY OF THE INVENTION

Mineralization of waste in a suitable treatment container achieves the stabilization of waste materials in a single operation, namely heat treatment, and the product of this process is a stable monolithic final waste form. Furthermore, the treatment container is suitable for storage or direct disposal.

According to its major aspects, waste materials are heated in a treatment container. The heat induces a chemical change that causes the waste to form a solid monolithic mass. This mass may then be properly transported in the treatment container for disposal or storage. This single step process has significant advantages for hazardous waste treatment and handling.

Some hazardous wastes have high nitrate content. Another waste is magnesium hydroxide (magnox) rich sludges from reprocessing of spent nuclear fuel. This magnox sludge contains heavy metals, organics, and radioactive constituents that are treated to remove water and organics, to stabilize the heavy metals and radionuclides, and to form a qualified monolithic final waste form suitable for disposal. Another waste is asbestos that comprises magnesium and iron rich silicates. This waste is heat treated to stabilize asbestos so as to destroy the fibers and leave the asbestos residues immobilized in a stable solid matrix, thus eliminating the hazardous characteristics of asbestos fibers.

In the first embodiment of the present invention, waste material is transferred into a treatment container and mineralizing additives are added. The waste material and mineralizing additives are mixed, heated, and disposed of in the same treatment container after being allowed to cool. In the second embodiment of this invention, waste material and additives (including both mineralizing and reducing additives) are mixed in a separate vessel. After mixing, the mixture is placed in the treatment container for heat treatment. The treatment container is also used for transportation, disposal, and storage.

Generally the waste material/mineralizing additive mixture is heated to an activation temperature of at least 150° C. but less than the fusion or melting temperature of a majority (50%), preferably substantially all, of the constituents of the mixture. Although the activation temperature is kept relatively low, stabilized minerals form. There is thus no need for heating to temperatures that will cause a majority of the mixture to vitrify, or melt thermosetting or thermoplastic materials. The heat treatment is used in part to vaporize any water in the waste. Heating the material to temperatures of at least 200° C. will also result in the vaporization of most, preferably a majority (50%), more preferably substantially all, of the volatile organic compounds within the material. At temperatures greater than 400° C., most, preferably a majority (50%), more preferably substantially all, of the volatile and semi-volatile organic compounds will have vaporized, and at temperatures greater than 600° C., most, preferably at least a majority (50%), more preferably substantially all, of the nitrates will have vaporized. The heat source for the heat treatment of the mixture may be internal or external to the treatment container.

Importantly, because the additives are mineralizing agents that form a heat activatable mixture with the waste material, they cause this mixture in the treatment container to form stable, insoluble mineral crystals or phases when heated to their mineralization temperature range. Thus, the mineralization reactions of the present invention produce at least one crystalline mineral substance, and a final product in which preferably a majority, more preferably substantially all, of the mixture has been converted to a monolithic form.

Several types of mineralized product compounds may be formed in this process. Product compounds include sodium aluminosilicate, sodium silicate, sodium aluminate, sodium carbonate, sodium calcium silicate, calcium sulfate, calcium chloride, calcium fluoride, calcium phosphate, magnesium phosphate, sodium magnesium/iron silicates, sodium magnesium/iron silicate phosphates, and still others, such as compounds where sodium is substituted by potassium or other alkali metals. The type of product compounds resulting from the process depends on the mineralizing additives used and the composition of the waste.

The preferred mineralizing additives include aluminosilicates such as clays, zeolite, silica gel, silica, silicates, phosphate compounds, calcium compounds, magnesium compounds, titanium compounds, iron compounds, and aluminum compounds. These additives combine with alkali metals in the waste to form nepheline, nosean, sodalite, fairchildite, natrofairchildite, dawsonite, elitelite, shortite, parantisite, maricite, buchwaldite, bradleyite, combeite, and numerous other similar mineral variations of these compound components. Certain wastes can be pretreated with an additive to facilitate mineralization. For example, asbestos can be at least partially dissolved in a caustic or acidic solution with the resultant partially dissolved slurry or solution being optionally mixed with other additives, and then the final mixture can be heat treated to form a non-hazardous, non-asbestos, non-fibrous mineralized monolith—all without melting the waste.

Generally water soluble alkali metal compounds in waste require further stabilization prior to disposal to prevent water dissolution, an undesirable characteristic because free water could lead to leaching and migration of waste material after the product is buried. Therefore, the production of water insoluble alkali metal compounds, such as Nosean and Nepheline, is preferred.

Reducing additives may also be mixed with the waste along with mineralizing additives to remove oxygen. Oxygen is present in the waste materials containing nitrates, nitrites, and other nitrogen oxides. Suitable reductants may include sugar, glycol, glycerol, ethylene carbonate, formic acid, alcohols, carbon, and a wide variety of other carbonaceous or organic compound reducing agents. Gas phase reductants may also be added to the mixture for reduction of nitrates and other unwanted waste material oxides. Additional metal reducing additives may also be mixed with the waste along with mineralizing additives to reduce certain waste constituents (mainly metals) to a lower, less water-soluble form. For example, mercury can be reduced to mercury sulfide by addition of a reducing agent such as sodium sulfide, potassium sulfide, calcium sulfide, iron sulfate, hydrazine, formic acid, sulfuric acid, stannous chloride, and other similar reducing agents. In like manner, water-soluble chromium in a +6 oxidation state can be reduced to insoluble chromium in a +3 oxidation state by means of the metal reducing agents.

In a third embodiment of the invention, the waste material is pretreated by addition of a reducing agent or by dissolution in a mineralizing additive prior to optional mixing with other such additives. For example, asbestos can be partially dissolved by placing the asbestos in a hot caustic solution so that the asbestos fibers are destroyed by being at least partially dissolved prior to further treatment according to the first and second embodiment processes described above. The destructive of asbestos fibers can be performed in one or two steps. In the first step, the asbestos fibers are destroyed by at least partially dissolving them in a caustic solution, preferably a sodium hydroxide solution. The asbestos that is not completely dissolved in this step forms a non-fibrous, gelatinous residue and the asbestos solution containing this residue can then be mixed with additives, such as clay, and heated in a treatment container. Alternatively, the resulting residue can be treated with an acid solution, either separately or in the asbestos solution, to further dissolve the residue. The asbestos solution and the residue solution may then be mixed with additives and heat treated, either together in the same container or separately in different containers. For the second step, i.e., dissolution of the residue with an acid, the preferred acids include sulfuric acid, formic acid, oxalic acid, and phosphoric acid. Other organic and mineral acids also may be used. However, it is preferred that hydrofluoric, nitric and hydrochloric acids not be used for the second acid dissolution step as they contribute fluorides, nitrates and chlorides, respectively, to the waste material, which could adversely impact the quality of the stabilized product from the treatment process and the off-gas emissions from the treatment process.

Another embodiment of heat-activated stabilization may be achieved by mixing the waste with additives that will partially react at ambient temperature to produce a mixture having a modified chemical composition and properties. The partially reacted mixture is then exposed to thermal treatment in a fluidized bed to form a granular product, such as an inorganic grit as described in U.S. Pat. No. 6,084,147, the entire contents of which are expressly incorporated herein by reference. This granular product is subsequently solidified into a monolithic waste form in a treatment container in accordance with the present invention. This type of process therefore uses two separate stages or operations and two separate process containers, i.e., the fluidized bed vessel and the subsequent heat treatment container. Mixing of the waste with additives for forming the granular product is not deemed to be one of these operations.

These embodiments and their advantages will be apparent to those skilled in the art of hazardous waste treatment from a careful reading of the Detailed Description of Preferred Embodiments as presented below.

DETAILED DESCRIPTION OF PREFERRED EMBODIMENTS

The present invention is a process for converting waste into a monolithic solid suitable for transportation and disposal by mixing the waste with mineralizing additives and, optionally, reducing additives, to form a mixture, and then by heating the mixture to a temperature within a mineralization range. The present disclosure is described with respect to radioactive waste and asbestos waste but any nitrogen-containing, magnesium-containing, silicate-containing, calcium-containing, aluminum containing waste, alkali-containing wastes, chloride-containing waste, fluoride-containing waste, phosphorous- or phosphate-containing waste, and sulfur- or sulfate-containing waste, or output stream containing one or more of the foregoing wastes, can be processed using the methods and apparatuses described herein.

The terms "disposal container" and/or "treatment container" both refer generally to a relatively small container, holding preferably 1 to 50 cubic feet, more preferably 7 to 30 cubic feet, which is made for the purposes of containerizing wastes for disposal by shallow land burial (as opposed to a separate reaction or mixing vessel). The treatment and disposal container also is not designed for higher temperatures, say 1000° C. or higher, but can withstand environments in which their temperature rises to 600° C. to 750° C., or perhaps somewhat higher, without loss of structural integrity or geometry.

A preferred embodiment of the invention involves a single treatment and disposal container in which the waste material can be mixed with additives, heat treated and disposed of. Another preferred embodiment involves the use of a first container or vessel for mixing waste materials with additives, and a second container for heat treatment of this mixture. This heat treatment container is also intended for use as a storage and/or disposal container, in which the waste materials and additives, once heated, will form a mineralized monolithic solid. The reduced handling, and in particular, the reduced transferring of the waste from one container to another, is an important feature of the present invention.

The monolithic solid that is formed after heat treatment is a solid, sufficiently stable form for transportation and disposal without further treatment. The mineralized solid typically includes sodium aluminosilicates, sodium aluminosilicates with substituted chlorine, fluorine, phosphorus, sulfate, radionuclides, and heavy metals in the crystalline structure, sodium calcium silicate, calcium sulfate, calcium fluoride, calcium phosphate, magnesium phosphate, magnesium silicate, magnesium silicate phosphates, magnesium/iron silicate, magnesium/iron phosphates, and similar water-insoluble compounds, including alkali metals substituted for the sodium in the above list.

Stabilization as used in the present process is the conversion of waste materials into a substantially mineralized, substantially solidified and substantially monolithic form that has the following properties and/or characteristics:

The solidified waste form satisfies treatment standards for heavy metal leach resistance.

Radionuclides and other toxic and hazardous materials present in the waste are substantially immobilized in the solid monolithic waste form so that they satisfy disposal facility performance requirements.

The solid monolithic waste form has structural and compositional characteristics that meet requirements of applicable regulatory agencies, including requirements related to: compressive strength, porosity, permeability, leach resistance, oxidation resistance, friability, fungal and bacterial resistance, hydration resistance, integrity after thermal cycling, and dryness or lack of free liquids.

Stabilization as defined for this invention does not include production of a monolith by typical cement or other methods of encapsulation, incorporation, bonding or binding where the monolith is formed by non-heat-activated means. For example, typical cement solidification processes turn the waste/cement mixture into monoliths by the growth of hydration bonds and/or crystallization at or near ambient temperatures. These chemical reactions may be slightly exothermic which may increase the temperature of the materials, but the reactions initiate at ambient temperatures, and temperatures significantly above ambient are not required to initiate the reactions.

Heat-activated as defined for this invention means that heat is applied to the mixture to initiate a mineralization reaction that will result in formation of a monolithic solid waste form. Although some mineralization reactions can partially occur at ambient temperature, i.e. without heat application that increases the material temperature, the extent of reaction is limited and would not produce a stabilized monolith. Heat-activation applies to methods of stabilizing waste mixtures where ambient temperature reactions are not sufficient to cause these mixtures to stabilize.

In addition, the heat-activation temperature is less than the melting point of most, preferably a majority, more preferably substantially all, of the waste materials and additives. This means that stabilized minerals can be formed without melting a majority of the wastes and additives, in contrast to the processes of vitrification, sintering, and thermosetting and thermoplastic encapsulation. Therefore, the present process takes place at less than the temperature of waste vitrification (melter) processes and sintering processes which operate at temperatures greater than 900° C., such that substantially all or at least a majority of the materials melt and/or fuse into a final waste form that becomes a monolithic solid upon cooling.

For example, if one were to mix magnesium hydroxide sludge with Portland cement and water in the right proportions at ambient temperature, one could achieve a monolithic solid of magnesium hydroxide and calcium carbonates and silicates. However, according to the invention, if magnesium hydroxide and Portland cement are mixed and heated to a temperature above approximately 600° C., the mineral magnesium-calcium-silicate would be formed, which has superior leach resistance and stability compared to a solid achieved by mixing magnesium hydroxide sludge with Portland cement at ambient temperature. Additionally, the Mg—Ca—Si mineral would occupy a smaller volume, as water and organics would have been eliminated in the higher temperature heat-activated stabilization. The reduced volume translates into greater savings in disposal costs and perhaps lower transportation costs as well.

Another example of the invention would be the denitration and mineralization of sodium nitrate containing wastes. If the sodium nitrate wastes are mixed with a reductant and one or more mineralization additives, but not heat activated, some denitration reactions and even some mineralization reactions may occur, but only very slowly, over a period of hours and days. In fact, monolithic stabilization will likely never be achieved without the introduction of sufficient heat. However, when heat is applied to the same mixture, at temperatures over 200° C., preferably over 400° C., the water in the waste is quickly evaporated, the majority, preferably substantially all, of the nitrates are converted to nitrogen gas, and the majority, preferably substantially all, of the inorganic components and alkali metals in the wastes are converted into crystalline mineral products in a monolithic waste form in a matter of seconds to hours depending upon the temperature used. Thus the present process makes rapid monolithic mineralization feasible, with corresponding increases in productivity.

A purpose of the present invention is to stabilize waste materials in a single operation in a single container, wherein following mixing of waste and additives in the container, the solidification, stabilization, and production of a monolithic final waste form are accomplished in the same container by the introduction of heat.

The inorganic constituents in the waste material, as well as any radionuclides, non-volatile heavy metals, Cl, F, S, and P compounds present in the waste, will be converted into stable minerals by the present process. The predominant mineralized products that are produced are listed below. These minerals are generally not water soluble. The relative amount of each product compound is dependent upon the type of additives used and the inorganic composition of the waste, where the more complex compounds are shown with abbreviated chemical formulas for simplicity:

Sodium-aluminosilicate (Na2O—Al2O3-2SiO2, Na—Al—Si), including substituted NO3, Cl, F, P, S compounds, metals, and heavy metals in the crystalline structure
Sodium silicate (Na2O-2SiO2)
Sodium aluminate (Na2O-2Al2O3)
Sodium calcium silicate (Na—Ca—Si)
Calcium sulfate (CaSO4)
Calcium fluoride (CaF2)
Calcium phosphate (Ca3(PO4)2)
Magnesium phosphate (MgKPO4)
Magnesium calcium silicate (Mg—Ca—SiO2)
Magnesium silicate phosphate (Mg—SiO2-PO4
Magnesium calcium silicate phosphate (Mg—Ca—SiO2-PO4)
Magnesium iron silicate (Mg—Fe—SiO2)
Magnesium silicate (Mg—SiO2)

The preferred mineralizing additives include aluminosilicates (clays), silica gel, silica, silicates, phosphates, Ca, Mg, Ti, Fe, aluminum gel, and Al compounds that combine with alkali metals to form synthetic and naturally occurring minerals as listed above and below (Note: Only the main elemental constituents are listed for simplicity). In the event the waste material is deficient in alkali metal content, alkali metals compounds and hydroxides can also be added to provide for substantially complete mineralization of the waste:

Nepheline, Na—Al—Si
Nosean, Na—Al—Si—SO4
Carnegieite, Na—Al—Si
Sodalite, Na—Al—Si, and substituted species with NaCl, NaNO3, and NaF
Fairchildite, K—Ca—CO3
Natrofairchildite, Na—Ca—CO3
Dawsonite, Na—Al—CO3
Eitelite, Na—Mg—CO3
Shortite, Na—Ca—CO3
Parantisite, Na—Ti—Si
Maricite, Na—Fe—PO4
Buchwaldite, Na—Ca—PO4
Bradleyite, Na—Mg—PO4—CO3
Combeite, Na—Ca—Si
Na—PO4, Na2CO3, Na—Al, Mg—PO4, Na—Al—PO4, Na—Mg—PO4, Ca—Si, and Na—(Ca,Fe,Mg)—Si The most environmentally stable minerals have been shown to be feldspathoids, Nepheline, Nosean, Sodalite, Carnegieite and related aluminosilicates, and these are thus most preferred.

The generation of water-insoluble sodium/potassium/aluminum/calcium/magnesium/phosphate/sulfide products is preferred. Thus, the generation of water-insoluble alkali metal products is very desirable. For this reason, the most preferred products are the water-insoluble species such as Nosean and Nepheline. The Nosean and related sodium aluminosilicate compounds form a crystalline, cage-like structure that has the ability to substitute and bind large atoms (such as cesium, technetium, and other radionuclides and heavy metals) within the crystalline structure to produce a highly leach-resistant product. The sodium aluminosilicate compounds have demonstrated that they have leach-resistance that is substantially better than the Land Disposal Restrictions (LDR) Universal Treatment Standard (UTS) limits for heavy metals. The Cl, F, P, and sulfates in wastes are also incorporated into the crystalline structure of the sodium aluminosilicate compounds. The present process can thereby effectively stabilize potential acid gases as well as inorganic materials.

In order to generate the alkaline earth mineralized compounds mentioned above, the following mineralizing additives can be used, each mineralizing additive would be added to the waste materials in the proportions needed to generate the desired higher melting point and water-insoluble compounds. In the following examples, sodium is used but the same is true of other alkaline metals such as potassium, cesium, etc. Other combinations of the mineralizing additives and waste constituents are anticipated as there are literally hundreds of variations of mineral forms with substituted mineral structures that all use the same elements:

Addition of lime (CaO) or other Ca compounds such as calcium carbonate, calcium silicate or nitrate could provide conversion of alkaline earths to Ca rich final product, e.g. Natrofairchildite.
Addition of magnesia (MgO) would produce minerals rich in magnesia, e.g. Eitelite.
Addition of clays (aluminosilicates such as kaolin, bentonite, troy, etc) or zeolites or precursors to produce a Nepheline, Nosean or other related sodium aluminosilicates.
Addition of only Al compounds including; aluminum nitrate, Al(NO3)3, aluminum hydroxide or tri-hydrate Al(OH)3; aluminum gel, aluminum metal particles, etc. will produce a sodium-aluminate product compound. For wastes with a high silica content the product would be sodium aluminosilicates. In this case the aluminum additive and the silica in the waste form a synthetic clay that can then form alkali aluminosilicates with the alkali metals in the waste.
Addition of alkali metal hydroxides will produce alkali-rich minerals that will tend to more easily form monolithic solids from wastes that are deficient in alkali metals. For example, addition of sodium hydroxide to asbestos (Mg/Fe-Silicates) will partially dissolve the asbestos fibers and then convert the Mg/Fe-Silicates into a monolithic, non-fibrous solid that is free of asbestos fibers.

Addition of phosphate compounds produces bonded ceramic minerals such as Maricite, Buchwaldite, Bradleyite or other PO4 containing compounds. For waste feeds containing phosphate compounds, such as tri-butyl phosphate, the final solid product would be an inorganic phosphate as listed above. To bond with phosphate in the waste, it is preferred that a clay, silica, iron, or calcium additive be used to make a water-insoluble product.

Addition of silica gel, silica, and/or sodium-silicate compounds produces a sodium silicate, magnesium silicate, sodium magnesium silicate product, or for wastes with a high aluminum content, the product would be sodium aluminosilicates. In this case the silica additive and the aluminum in the waste form a synthetic clay that can then form alkali aluminosilicates with the alkali metals Table 1, below, provides typical simplified reaction equations for formation of some of the mineralized products of the present invention. Generally, the minerals form larger structures with much large numbers of atoms than shown in Table 1, which is shown only as an example of the types of reactions that can occur.

TABLE 1. Mineralization Chemistry For Converting Sodium, Potassium, Aluminum, Sulfates, Chlorides and Radionuclides into Sodium AluminoSilicates

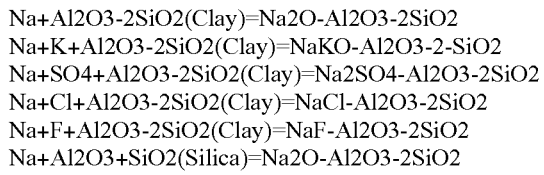

Reductants may also be mixed with the waste in the treatment container to assist in the removal of unwanted oxidized compounds. Oxygen is often present in the waste materials in the form of nitrogen oxides, such as nitrates and nitrites, as well the oxides of other elements. Reducing additives (or "reductants") that can be added to the waste materials can be essentially any solid or liquid that can remove oxygen from the waste materials or change oxidation state of certain metals. Reductants can include: carbon and carbonaceous materials such as sugar, glycol, glycerol, ethylene carbonate, formic acid, alcohols, and a wide variety of other liquid or solid carbonaceous reductants, i.e. essentially any organic material. Reductants to be mixed with the waste materials can be miscible with the waste materials, soluble in water or other liquid, or solid and any combination of the above.

In addition to solid and liquid reductants that can be added to the waste material, gas-phase reductants such as carbon monoxide, methane, hydrogen or other gaseous carbonaceous materials can be injected or pumped into the treatment container to provide reduction of nitrates and other unwanted waste material oxides. Additional metal reducing additives may also be mixed with the waste along with mineralizing additives to reduce certain waste constituents (mainly metals) to a lower, less water-soluble form. For example, mercury can be reduced to mercury sulfide by addition of a reducing agent such as sodium monosulfide, potassium monosulfide, calcium sulfide, iron sulfate, hydrazine, formic acid, sulfuric acid, stannous chloride, and other similar reducing agents. In like manner, water-soluble chromium in a +6 oxidation state can be reduced to insoluble chromium in a +3 oxidation state by means of the metal reducing agents.

Wastes containing nitrogen oxides require processing to remove these oxides, to stabilize heavy metals and radionuclides, if present, and to remove organics in order to stabilize these wastes. For this type of waste, it is possible to mix the nitrogen oxide waste with a reductant and one or more mineralizing additives in a separate vessel. The mixture is then placed in a treatment container and heated. Alternatively, the mixing and heating can be accomplished in a single container.

The application of heat to the contents of the treatment container will cause any water to evaporate, thus drying the waste material. Continued heating will cause organics to volatize and/or pyrolyze, and nitrates and nitrites to decompose. The reductant will serve to convert the nitrates and nitrites in the waste material to nitrogen gas with only relatively small amounts of gaseous nitrogen oxides being generated. The heat will also cause the waste materials and mineralizing additives to crystallize and bond into a solid monolithic final form. A specific example of this is the stabilization of a sodium nitrate solution that contains nitrate-containing materials, such as nitric acid, sodium nitrate, other nitrates, nitrites, organics, heavy metals, sulfur, halogens, and radioactive materials. To stabilize this waste, it is mixed with a reductant and a mineralization additive in a separate mixing container or vessel. Samples can be taken to verify the uniformity of the mixture and that the mixture contains the desired proportions of additive and waste material.

The mixture is then placed into a treatment container for heat-activation. The mixture is heated in this container by means of an internal or external heat source to initiate the chemical reactions. As the waste mixture is heated to its mineralization temperature, the water is evaporated and volatile organics vaporize first. As additional heat is applied, the semi-volatile organic compounds are thermally distilled through pyrolysis reactions, which break the long-hydrocarbon polymers and chains into more volatile gas-phase organics. The application of heat causes evaporation of nitric acid and thermal decomposition of nitrates and nitrites to form gaseous nitrogen oxides. The reductant(s) will react with the solid, liquid and gas-phase nitrogen oxide (NOx) and carbon components to form mainly nitrogen gas, carbon oxides (mainly carbon dioxide and some carbon monoxide) and water from the oxygen in the NOx components.

The application of heat further provides the energy needed for the inorganic components of the waste materials and additives to form mineral compounds that will effectively solidify a majority, preferably substantially all, of the waste into a final mineralized monolithic waste form. The specific minerals that form depend on the inorganic composition of the waste material and the choice and amount of the additive or additives used. For example, if clay were added as the mineralizing additive, a sodium aluminosilicate and other feldspathoid related minerals would be formed as the monolithic solid. If a silicate were used as the mineralizing additive, a sodium silicate mineral would be formed as the monolithic solid. If the waste had a high magnesium content and silica were added as the additive, a magnesium silicate would be formed as the monolithic solid. The sulfur and halogens, such as chlorine and fluorine, would also be mineralized to form Na2SO4, NaCl and/or NaF substituted sodium aluminosilicates or similar minerals. The heavy metals and radioactive components are also incorporated into the structure of the minerals of the monolith. It will be appreciated that heavy metals, halogens, sulfur, radionuclides and other undesirable constituents in the wastes can be mineralized into a stable monolithic waste form according to the teachings of the present invention.

The invention may be further understood by the following description of a test run that demonstrates its feasibility. A waste surrogate was prepared by mixing 1358 grams (g) of water, 270 g of NaOH and 303 g of NaNO3 in a plastic mixing vessel, and then adding to this surrogate waste in the mixing vessel 889 g of clay as a Al—Si mineralizing additive and 152 g of sucrose as a reducing additive (reductant). These five components were then mixed together in the mixing vessel with two drops of a non-silicon defoamer, which was organic-based and also served as a second reductant. This mixture of waste materials, mineralizing additive and reducing additives was then poured into a 500 ml steel can, which served as the treatment container.

The treatment container and its contents were placed into a furnace and heated up to 750° C. at a rate of 10° C./minute, and then were held at 750° C. for a two hour period, after which the container was removed from the furnace and allowed to cool. The final solid monolithic waste form resulting from this process was white in color and was hard to the touch. Mechanical action was required to break this monolith into pieces. A volume reduction by a factor of approximately two was observed from the initial waste and additive mixture volume to the volume of the final monolithic form. There were minimal nitrogen oxides (NOx) noticed in the off-gases generated during heating, thereby demonstrating the desired reduction of nitrates to nitrogen gas. The off-gases were vented to a hood and released to the atmosphere.

The following narrative describes a full-scale application of the invention wherein waste materials and mineralizing additives are combined into the desired mixture composition in a mixing tank or vessel stirred with an internal mixer. The fluid solutions are first placed into the mixing vessel and the solid materials are then metered into this vessel while mixing the fluid solutions to form a slurry. The fluids and solids may include mineralizing and/or reducing additives. The slurry of combined waste and additives is mixed until sufficiently homogeneous and then the contents of the mixing vessel are transferred to a metal treatment container. It is also feasible to perform the foregoing mixing step in this same metal treatment container so that only a single container is used for mixing, heat treatment and disposal. The treatment container is then heated to the desired mineralization temperature by means of external or internal heaters, which are preferably electrical although combustion-fired, microwave, induction heating or other suitable heating means are also suitable.

The treatment container heat-up time is controlled by adjusting the heat input from the heat source. The water is first evaporated from the waste/additive mixture. As the waste/additive mixture continues to heat-up, volatile organics are evaporated and then semi-volatile organics are pyrolyzed such that semi-volatile hydrocarbon molecules are thermally broken down into smaller sized fractions which are then volatized from the mixture. Once the water and volatiles are removed, the mixture generally becomes a solid monolith.

As heating is continued, the non-volatile waste constituents and the mineralizing additives react and combine into new, generally crystalline mineral structures that provide the strength in the monolith. The amount of crystal growth and bonding between the waste and additives largely determines the strength and ultimate properties of the final post treatment monolithic waste form. The temperature of the heat treatment is dependent upon the waste constituents, the selection of mineralizing and reducing additives, and the desired final monolithic mineral form. The time of heat treatment is dependent upon the size of the treatment container and the cure time for the minerals to fully form. These times can vary from 1 hour to several days for a large monolith to fully mineralize.

The composition of each waste stream and additive mixture will need to tested to verify the time and temperature that provide for desired level of mineralization and conversion to the desired monolithic mineral form. The adequacy of the stabilization is determined by sampling the monolith and performing analytical tests to confirm that the properties of the monolith meet the requirements for disposal or storage. The treatment container is sealed after the desired monolith form has been achieved and cooled to near ambient temperature. The sealing device can be a simple snap-on lid or a more complex lid, such as seal welding a metal lid for certain more restrictive applications.

Off-gases from the treatment container are directed through an off-gas treatment system that is designed to remove trace particulates and residual acid gases and other volatiles of concern. If mercury has not been stabilized, it can volatize and will also need to be removed from the off-gas stream through adsorption or other approved process. Water vapors and volatile organics can be condensed and treated separately if desired. Purge gases are not required in the treatment container but can be used to help control the environment, such as using nitrogen or other inert gas to prevent accumulation of organic vapors in the container. An example of the hardware for heating the treatment container and handling the off-gases is that shown and described in U.S. patent application Ser. No. 10/209,090 filed Jul. 31, 2002, and published as Pub. No. US 2004/0024279 A1 on Feb. 5, 2004, the entire contents of which are expressly incorporated herein by reference.

Another typical waste material is Magnox (magnesium hydroxide) rich sludge from reprocessing of spent nuclear fuel. The Magnox sludge contains heavy metal, organic and radioactive constituents that must be treated to remove the water and organics, stabilize the heavy metals and radionuclides and form a monolithic final waste form that is qualified and suitable for disposal. With Magnox wastes, there are usually minimal nitrates so a reductant is not normally used. One or more mineralizing additives, such as clay, phosphate, silica or sodium silicate compounds, are added to these wastes to form a monolithic structure during heat treatment. For example, the clay would bind the heavy metals and radionuclides and the silica, phosphate, and/or sodium-silicate compounds would mineralize the magnesium and form the base structure of the monolithic final waste form. In this case it may be necessary to add caustic (sodium hydroxide) to provide full mineralization of the heavy metals and radionuclides with the clay via formation of sodium aluminosilicate.

In an additional embodiment of the invention, waste asbestos is made non-hazardous without vitrification. The treatment of asbestos can be performed in two or three steps. First, asbestos can be partially dissolved by placing the asbestos in a hot caustic (sodium hydroxide) solution so that the silica in the asbestos fibers is partially to substantially dissolved. Although partial dissolution destroys the fibers, it leaves a gelatinous residue. The optional second step involves dissolution of this residue by contacting it with an acidic solution. This second step may be necessary if temperatures less than 200° C. are used when heating the treatment container. The partially dissolved asbestos solution from the caustic step and/or the substantially completely dissolved asbestos solution from the optional acid step may then be mixed with another mineralizing additive, such as iron oxide, phosphate or calcium oxide, although in some instances the caustic and/or acid used may alone serve as the mineralizing additive. The dissolved asbestos and mineralizing additives are then treated by heating the treatment container to preferably about 400° C. to 600° C. until a majority, preferably substantially all, of the mixture, is converted into a Na—Mg—Fe—Ca-Silicate mineral solid if calcium and/or iron additives are used, or if there is sufficient calcium and/or iron already present in the asbestos waste.

It will be apparent to one of ordinary skill in the art of waste treatment that many modifications and substitutions can be made to the preferred embodiments described above without departing from the spirit and scope of the present invention as defined by the following claims.

What is claimed is:

1. A process for stabilizing a material, said process comprising steps of:
providing a treatment container;
mixing the material and a mineralizing additive to form a mineralizable mixture; and
heating said mixture in said treatment container to a temperature sufficient to cause at least a portion of said mixture to mineralize and form a monolithic mineralized solid in said treatment container, wherein said temperature is less than about the melting temperature of said monolithic mineralized solid.

2. The process of claim 1, wherein a majority of said mixture is mineralized and forms a monolithic, mineralized solid.

3. The process of claim 1, wherein substantially all of said mixture is mineralized and forms a monolithic, mineralized solid.

4. The process of claim 1, wherein said mineralizing additive comprises a calcium containing compound, a phosphorus containing compound, a magnesium containing compound, a silicon containing compound, an aluminum containing compound, an aluminosilicate compound, an alkali metal compound, an iron containing compound, a titanium containing compound, or a combination of two or more thereof.

5. The process of claim 4, wherein said material comprises asbestos and said alkali metal compound is sodium hydroxide.

6. The process of claim 1, wherein said material and said mineralizing additive are mixed in said treatment container.

7. The process of claim 1, wherein said material contains water and wherein said temperature is sufficient to evaporate substantially all of said water without melting a majority of said mixture.

8. The process of claim 1, wherein said material contains water and volatile organic compounds, and wherein said temperature is sufficient to evaporate substantially all of said water and to volatize substantially all of said volatile organic compounds without melting a majority of said mixture.

9. The process of claim 1, wherein said temperature is above 400° C., but below a temperature at which a majority of said mixture melts.

10. The process of claim 1, wherein said material contains water and semi-volatile organic compounds, and wherein said temperature is sufficient to evaporate substantially all of said water and to volatize substantially all of said semi-volatile organic compounds without melting a majority of said mixture.

11. The process of claim 1, wherein said heating step heats said mixture to a temperature in the range of 600° C. to 850° C.

12. The process of claim 1, further comprising a step of adding a reducing agent to said mixture.

13. The process of claim 12, wherein said reducing agent comprises carbon or an organic material.

14. The process of claim 13, wherein said organic reducing agent comprises sugar, glycol, glycerol, ethylene carbonate, formic acid, alcohols, other carbonaceous compounds, or a combination of two or more thereof.

15. The process of claim 14, wherein said mineralizing additive comprises a calcium containing compound, a phosphorus containing compound, a magnesium containing compound, a silicon containing compound, an aluminum containing compound, an aluminosilicate compound, an alkali metal compound, an iron containing compound, a titanium containing compound, or a combination of two or more thereof.

16. The process of claim 12, wherein said reducing agent comprises a gaseous compound.

17. The process of claim 12, wherein said reducing agent comprises sodium sulfide, potassium sulfide, calcium sulfide, iron sulfate, hydrazine, formic acid, sulfuric acid, stannous chloride, other metal reducing agents, or a combination of two or more thereof.

18. The process of claim 1, wherein said material comprises heavy-metal containing waste, sulfur compound containing waste, halogen containing waste, radionuclide containing waste, asbestos containing waste, alkali metal containing waste, or a combination of two or more thereof.

19. The process of claim 1, wherein said mineralizing additive is selected to produce a monolithic solid containing feldspathoid minerals, silicate-rich minerals or a combination thereof.

20. The process of claim 1, wherein said mineralizing additive is selected to produce a monolithic solid containing calcium-rich minerals, phosphate-rich minerals, titanium-rich minerals, magnesium-rich minerals, iron-rich minerals, silica-rich minerals, aluminum-rich minerals, or a combination of two or more thereof.

21. A process for stabilizing a waste material, said process comprising steps of:
mixing the waste material and a mineralizing additive in a disposal container to form a mineralizable mixture;
applying sufficient heat to said mixture in said disposal container to cause at least a portion of said mixture to mineralize and form a monolithic mineralized solid; and
disposing said monolithic mineralized solid in said disposal container.

22. A process for stabilizing a nitrate-containing material, said process comprising steps of:
mixing the nitrate-containing material and a mineralizing additive to form a mineralizable mixture;
heating said mixture in a disposal container to a temperature sufficient to cause at least a portion of said mixture to mineralize and form a monolithic mineralized solid without substantially melting said monolithic mineralized solid.

23. The process of claim 22, wherein said nitrate-containing material is heavy-metal containing waste, sulfur compound containing waste, halogen containing waste, radionuclide containing waste, organic compound containing waste, alkali containing waste, or a combinations of two or more thereof.

24. The process of claim 22, wherein said temperature is sufficient to convert at least 50% of the nitrates to nitrogen containing gas.

25. The process of claim 22, wherein said mineralizing additive comprises a calcium containing compound, a phosphorus containing compound, a magnesium containing compound, a silicon containing compound, an aluminum containing compound, an aluminosilicate compound, an alkali metal compound, an iron containing compound, a titanium containing compound, or a combination of two or more thereof.

26. The process of claim 22, wherein said mixing step takes place in said disposal container.

27. The process of claim 22, further comprising a step of adding a reducing agent to said mixture.

28. A process for stabilizing a material containing fibers of asbestos, said process comprising steps of:

mixing the asbestos-containing material and a caustic solution containing an alkali metal compound as a mineralizing additive to form a mineralizable mixture;
allowing said caustic solution to at least partially dissolve said asbestos; and
heating said mixture in a disposal container to a temperature sufficient to cause at least a portion of said mixture to mineralize and form a non-fibrous mineralized solid having a monolithic form, wherein said temperature is less than about the melting temperature of said non-fibrous mineralized solid.

29. The process of claim 28, wherein said mixture contains a residue from partial dissolution of asbestos and said process further comprises a step of contacting said residue with an acidic solution to at least partially dissolve said residue prior to said heating step.

30. The process of claim 29, wherein prior to said contacting step said residue is separated from said mixture and said separated residue is contacted with said acidic solution to dissolve at least a portion thereof and form an acidic residue solution, and then said acidic residue solution is added to said mixture before said heating step.

31. The process of claim 28, further comprising a step of adding a second mineralizing additive to said mixture, said second mineralizing additive being selected to facilitate formation of said monolithic solid.

32. The process of claim 31, wherein said second mineralizing additive comprises a clay, a calcium containing compound, a phosphorus containing compound, a magnesium containing compound, a silicon containing compound, an aluminum containing compound, an aluminosilicate compound, an alkali metal compound, an iron containing compound, a titanium containing compound, or a combination of two or more thereof.

33. A process for stabilizing a material containing asbestos, said process comprising:
dissolving a first portion of said material in a caustic solution containing an alkali metal compound as a mineralizing additive;
dissolving a second portion of said material in an acidic solution;
combining said solutions containing portions of said material to form a mineralizable mixture; and
heating said mixture in a disposal container to a temperature to cause at least a portion of said mixture to mineralize and form a mineralized solid having a monolithic form without substantially melting said mineralized solid.

34. A process for stabilizing a material, said process comprising steps of:
providing a treatment container;
mixing the material and a mineralizing additive to form a mineralizable mixture; and
heating said container to a temperature sufficient to cause at least a portion of said mixture to mineralize and form a monolithic mineralized solid in said treatment container without substantially melting said monolithic mineralized solid.

* * * * *